US008924129B2

(12) United States Patent
Hase

(10) Patent No.: US 8,924,129 B2
(45) Date of Patent: Dec. 30, 2014

(54) FUEL PUMP CONTROL DEVICE FOR AN INTERNAL COMBUSTION ENGINE

(75) Inventor: Takamitsu Hase, Isehara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 550 days.

(21) Appl. No.: 13/216,377

(22) Filed: Aug. 24, 2011

(65) Prior Publication Data

US 2012/0095667 A1 Apr. 19, 2012

(30) Foreign Application Priority Data

Oct. 15, 2010 (JP) ................................ 2010-232435

(51) Int. Cl.

*B60T 7/12* (2006.01)
*F02D 41/30* (2006.01)
*F02D 41/02* (2006.01)

(52) U.S. Cl.

CPC ........ *F02D 41/3082* (2013.01); *F02D 41/0225* (2013.01); *F02D 2200/101* (2013.01)
USPC ........... 701/104; 123/446; 123/447; 123/497; 701/103

(58) Field of Classification Search

CPC .................... F02D 41/3082; F02D 2200/0602; F02D 2250/31; F02D 41/3845; F02D 41/0025; F02M 37/08; F02M 63/0225; F02M 57/025; F02M 59/105; F02M 59/366; F02M 47/027; F02M 63/0007; F04B 49/20; B60W 10/06
USPC .......... 123/497, 446–447; 701/102–104, 110, 701/115; 417/410.1, 423.3
See application file for complete search history.

(56) References Cited

U.S. PATENT DOCUMENTS

| | | | | |
|---|---|---|---|---|
| 3,476,949 | A * | 11/1969 | Ballou | 290/36 R |
| 5,411,002 | A * | 5/1995 | Smitley | 123/497 |
| 5,505,180 | A * | 4/1996 | Otterman et al. | 123/497 |
| 7,302,938 | B2 * | 12/2007 | Yu et al. | 123/514 |
| 7,516,730 | B2 * | 4/2009 | Ukai et al. | 123/198 F |
| 7,559,310 | B2 * | 7/2009 | Yahata | 123/446 |

(Continued)

FOREIGN PATENT DOCUMENTS

| | | |
|---|---|---|
| JP | 58-48767 A | 4/1983 |
| JP | S59-120776 A | 7/1984 |

(Continued)

OTHER PUBLICATIONS

Office Action issued in corresponding Chinese Application No. 201110296248.3, mailed Nov. 1, 2013 (5 pages).

(Continued)

*Primary Examiner* — Erick Solis
*Assistant Examiner* — Carl Staubach
(74) *Attorney, Agent, or Firm* — Osha Liang LLP

(57) ABSTRACT

An engine fuel pump control apparatus is provided. The engine fuel pump control apparatus is connected to an engine and a transmission. A fuel pump is interposed in a fuel conduit between a fuel tank and the engine and the fuel pump has a selectively variable fuel delivery rate. A fuel pump controller is configured to adjust a fuel delivery rate from the fuel pump to the engine in which the fuel pump controller is configured to increase the fuel delivery rate as a rotational speed of the engine increases. The fuel pump controller is further configured to adjust the fuel delivery rate as a detected vehicle speed characteristic varies.

13 Claims, 4 Drawing Sheets

(56) References Cited

U.S. PATENT DOCUMENTS

| | | | | |
|---|---|---|---|---|
| 2003/0024509 | A1* | 2/2003 | Matusek et al. | 123/497 |
| 2008/0257313 | A1* | 10/2008 | Yahata | 123/510 |
| 2011/0011373 | A1* | 1/2011 | Shimura et al. | 123/497 |

FOREIGN PATENT DOCUMENTS

| | | | |
|---|---|---|---|
| JP | H01-038174 | B2 | 8/1989 |
| JP | 5-223027 | A | 8/1993 |
| JP | 2008-267250 | A | 11/2008 |
| JP | 2009-191724 | A | 8/2009 |
| WO | 2007/017627 | A2 | 2/2007 |

OTHER PUBLICATIONS

Office Action issued in corresponding Japanese Application No. 2010-232435, mailed on Jul. 29, 2014 (3 pages).

* cited by examiner

FUEL PUMP CONTROL DEVICE FOR AN INTERNAL COMBUSTION ENGINE

CROSS-REFERENCE TO RELATED APPLICATIONS

This application claims priority from Japanese Patent Application No. 2010-232435, filed Oct. 15, 2010, the contents of which are hereby incorporated by reference in their entirety.

BACKGROUND OF DISCLOSURE

1. Field of the Disclosure

The present disclosure relates to a control apparatus for an engine fuel pump mounted to an engine for supplying a controlled amount of fuel.

2. Description of the Related Art

Historically, the fuel amount fed to an engine from a fuel tank by a fuel pump was adjusted to correspond to the engine operating conditions, such as an actual required amount of fuel consumption, such that an excessive amount of return fuel will be reduced (See, Japanese Unexamined Patent Application Nos. S58-48767 to Niwa et. al, and H5-223027 to Yuda).

Niwa et al. discloses a basic control of voltage applied to an electrically operated fuel pump based on both an engine load and engine speed. Yuda improves this technology and calculates a required discharge fuel volume at a full load operation at each engine speed. By controlling the fuel amount to meet this full load operation in advance, possible response delays are avoided.

Another patent document, Japanese Unexamined Patent Application No. 2009-191724 to Sasaki et. al., discloses selectively driving and stopping a generator operatively connected to an engine in such a way that an applied voltage to an electrical fuel pump is adjusted between a battery voltage corresponding to a lower value and a raised value by an alternator.

SUMMARY OF THE CLAIMED SUBJECT MATTER

In one or more embodiments of the present disclosure, an engine fuel pump control apparatus is provided for a vehicle having an engine connected to a transmission. A fuel pump is interposed in a fuel conduit between a fuel tank and the engine, and the fuel pump has a selectively variable fuel delivery rate. A fuel pump controller is configured to adjust a fuel delivery rate from the fuel pump to the engine, in which the fuel pump controller is configured to increase the fuel delivery rate as a rotational speed of the engine increases, and in which the fuel pump controller is configured to adjust the fuel delivery rate as a detected vehicle speed characteristic varies.

In one or more embodiments of the present disclosure, a method is provided to control an engine fuel pump. First, a fuel delivery rate of a fuel pump is controlled based on an engine speed such that the fuel delivery rate becomes higher as the engine speed increases. Next, a vehicle speed characteristic is detected. Next, the fuel delivery rate is adjusted based on the detected vehicle speed characteristic.

In one or more embodiments of the present disclosure, a control apparatus for an engine fuel pump is provided for a vehicle having an engine connected to a transmission. A means for pumping fuel is interposed in a fuel conduit between a fuel tank and the engine. A means for selectively varying a fuel delivery rate is provided and a means for controlling the fuel delivery rate based on an engine speed is provided such that the fuel delivery rate becomes higher as the engine speed increases. A means for detecting a vehicle speed characteristic such that a means for adjusting the fuel delivery rate will set the delivery rate to be larger when the detected vehicle speed characteristic is at a lower vehicle speed characteristic value.

DETAILED DESCRIPTION

Figure 1:
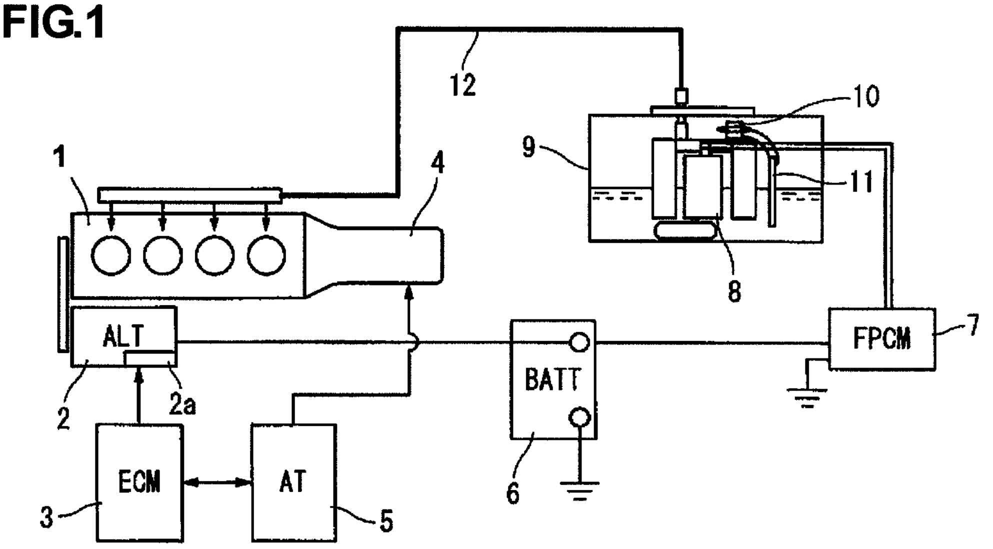
FIG. 1 is a schematic view showing a fuel system including a fuel pump to which a control apparatus according to one or more embodiments is applied.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Historically, as described above, control of the fuel delivery volume/rate was based on engine speed, or the rotational speed of the engine, as the operating parameter. However, if a high-power engine is involved, a rapid rise in engine rotational speed during vehicle acceleration may be expected and fuel efficiency may significantly decrease. Yuda, while providing a required full load volume corresponding to engine speed (i.e., rotational speed of the engine), would not provide a timely enough response to increase the delivery volume to cope with the rapid rise in engine revolutions. Should Yuda be adjusted to set a high supply volume to meet this rapid rise in engine revolutions, an excessive amount of fuel would have to be returned at high vehicle speeds, thereby decreasing efficiency.

According to one or more embodiments disclosed herein, a target fuel delivery rate from the fuel pump may generally be controlled based on a current or actual engine speed. However, a rapid increase of engine speed, and, thus the required amount of fuel, may be predicted based on appropriate vehicle operation conditions, and effective countermeasures may be provided in advance to adjust the target fuel delivery rate. Accordingly, predetermined values, determined in advance, may be used to adjust the fuel rate for proper efficiency at times of change in the rotational speed of the engine.

In particular, it should be noted that, historically, the speed change ratio (i.e., the transmission gear position) had not been fully considered. Because fuel delivery volume was determined solely by engine speed, securing a minimum amount failed to provide an appropriate fuel supply during a rapid increase in the engine speed.

According to the control apparatus for an engine fuel pump in accordance with one or more embodiments described herein, a fuel pump may be controlled to deliver fuel to an engine in a continuously variable or a stepwise manner. The delivery volume/rate may be determined based on an engine speed, rotational speed of the engine, gear, gear ratio, or other variable, such that the delivery volume/rate may be increased as the engine speed increases. Furthermore, the fuel delivery volume/rate may be determined by other detected vehicle speed characteristics, such as transmission speed change ratio, transmission speed ratio, vehicle speed, etc.

For example, a speed change ratio of a vehicle transmission, gear or gear position, may be detected and/or determined and adjustment of the delivery volume/rate of fuel may be performed based on the engine speed in such a way that the delivery volume may be larger at a lower engine speed as the speed change ratio becomes higher or as the gear is increased. As such, the fuel delivery rate may be adjusted to increase when a detected gear may be lower than a predetermined value. The fuel delivery rate may be increased at a low gear allowing for a higher volume of fuel in anticipation of necessary acceleration.

In one or more embodiments of the present disclosure, a fuel delivery volume/rate may be adjusted stepwise at one or a plurality of engine speed thresholds. Additionally, the threshold values may be set to be subject to change depending on a current speed ratio, current gear position, vehicle speed, speed change ratio, or other vehicle speed characteristic. For example, when the current speed ratio may be small (i.e., at low gear, for example first or second gear), the threshold value may be set smaller, while when the speed ratio may be large (i.e., at high gear, for example top gear), the threshold value may be set larger. Additionally, or alternatively, the threshold value may be set low at a low gear and set higher at a high gear. As noted above, the threshold may be configured to allow an increase in fuel delivery rate, and as configured may be set to anticipate required acceleration or need for an increased volume/rate of fuel.

In other words, at a larger speed change ratio of the transmission, a low gear or transitioning from a low gear, the fuel delivery rate may be set relatively higher compared to higher gears at the same engine speed so that an appropriate amount of fuel may be supplied even during a rapid rise in engine speed of the vehicle. This may occur when accelerating quickly in a low gear. On the other hand, when the speed change ratio remains low, such as at a high gear, a gradual increase in engine speed may be expected so that the fuel delivery volume/rate may be kept small up to the relatively higher engine speed. Similarly, when a vehicle is operated at a high gear, large amounts of acceleration are not anticipated, and the threshold value may be larger or higher, so that excessive fuel is not provided and/or wasted, and efficiency is maintained.

Furthermore, the transmission gear, or speed change ratio of the vehicle transmission, may generally relate to a vehicle speed so that the gear will be set lower as the vehicle speed decreases, for example when downshifting. Therefore, in one or more embodiments of the present disclosure, the relationship between the fuel delivery volume/rate and the engine speed may be adjusted depending upon a vehicle speed in such a way that the fuel delivery volume/rate may be made larger for a lower engine speed as the vehicle speed decreases, as discussed herein.

According to one or more embodiments of the present disclosure, fuel delivery volume/rate may be determined based on engine speed in consideration of the transmission gear, gear change, speed change ratio of the engine, vehicle speed, or other vehicle speed characteristic. Thus, even during a rapid rise in engine speed at a low gear an appropriate amount of fuel may be secured while avoiding an excessive amount of fuel delivery at a higher gear such that an appropriate, variable control of fuel delivery volume/rate may be assured.

The following is an explanation of one or more embodiments of the present disclosure directed to a control apparatus of an engine fuel pump, with reference to the drawings. Although only a few embodiments are described here, those skilled in the art will appreciate that other variations, configurations, and changes may be made without departing from the scope of the claims.

Now with reference to FIG. 1, an engine 1 is provided. The engine 1, for example, may be a gasoline engine equipped with fuel injection valves at each cylinder (not shown) and includes a generator or alternator (ALT) 2 which is driven mechanically by a crank shaft. The control of a fuel injection rate, injection timing, and ignition timing of a spark plug (not shown) may be controlled by an engine control module or unit (ECM) 3 in a comprehensive way. The alternator 2 may be a conventional alternator, with a rated power of 14 V (volts). The alternator 2 may have operation modes including a generation mode and a generation stop mode which may be changeable by controlling an armature coil current by way of a voltage regulator 2*a* housed within the alternator 2 in response to a command signal from engine control unit 3. Those skilled in the art will appreciate that one or more embodiments described herein may also be applicable to a diesel or other engine. Further, although described herein as using an automatic transmission, embodiments of the present disclosure may be equally applicable to a manual transmission, a CVT (continuously variable transmission) in which speed ratio is subject to change continuously, or other transmission configuration and/or operation known in the art.

The engine 1, as shown, is connected to a transmission 4, such as a step, automatic transmission that may include a torque converter and assistant gear change mechanism (not shown). The transmission 4 may be controlled, in part, by an automatic transmission (AT) controller 5. Various data and information may be configured to be exchanged between the engine control unit 3 and the AT controller 5. The transmission 4 may be controlled by a signal from the AT controller 5 based on both a vehicle speed and an accelerator operation state to automatically assume an appropriate speed change ratio, in other words, automatically engage in an appropriate transmission gear. Control may be made to assume a lower speed ratio, such as a first ratio (first gear), at a lower vehicle speed, and assume a higher speed ratio (high gear), such as a sixth ratio (sixth gear), at a higher vehicle speed, with other ratios, two through five, for example, increasing the speed ratio or gear as the vehicle increases in speed. Further, control may be made in such a way to assume a lower gear as the accelerator operation increases while assuming a higher gear as the accelerator operation decreases. As such, when immediate acceleration is necessary, a lower gear may be set to thereby increase the engine speed.

The alternator 2 may be connected to a vehicle battery 6 with a nominal charge of 12 volts. The alternator 2 may further be connected via a fuel pump controller (fuel pump control module or FPCM) 7 to a fuel pump 8, such as an electrical fuel pump. Thus, the fuel pump 8 may be applied with a generation voltage when the alternator 2 is generating a voltage higher than that of the battery 6, while the fuel pump 8 may be applied with 12 volts from the battery 6 when the alternator 2 stops generating electricity, or when the voltage generated by alternator 2 is 12 volts or below. The fuel pump 8 may be configured to feed a delivery volume/rate of fuel (flow rate per unit time) in accordance with the applied voltage. As such, the fuel pump 8 may be configured to supply a selectively variable fuel delivery rate, at least partially dependent on a supplied voltage from either the vehicle battery 6 or the alternator 2.

Moreover, as shown in FIG. 1, the fuel pump 8 may be installed within a fuel tank 9 and may be configured to extract fuel from a bottom part of the fuel tank 9 and feed the fuel to a pressure regulator 10 for pressure adjustment to be supplied to each of the fuel injection valves of the engine 1 through a fuel conduit or supply tube 12. Any excessive fuel regulated or supplied at the pressure regulator 10 may be returned to the fuel tank 9 via a return pipe 11. Those skilled in the art will appreciate that alternative configurations of the fuel pump and engine are possible without departing from the scope of the present disclosure. For example, an alternative configuration may have the excessive fuel at the fuel injection valve to be returned by way of a return passage (not shown) to the fuel tank 9. Further, the illustrated configuration of FIG. 1 shows the fuel pump 8 within the fuel tank 9; however, those skilled in the art will appreciate that the fuel pump 8 may be disposed outside of the fuel tank 9, as part of the fuel conduit 12 connecting the fuel tank 9 and the engine 1. Alternatively still, another arrangement may be conceivable such that a separate, low-pressure fuel pump may be provided within the fuel tank 9 while a delivery rate controllable fuel pump 8 may be provided within and/or attached to the fuel conduit 12.

Figure 3:
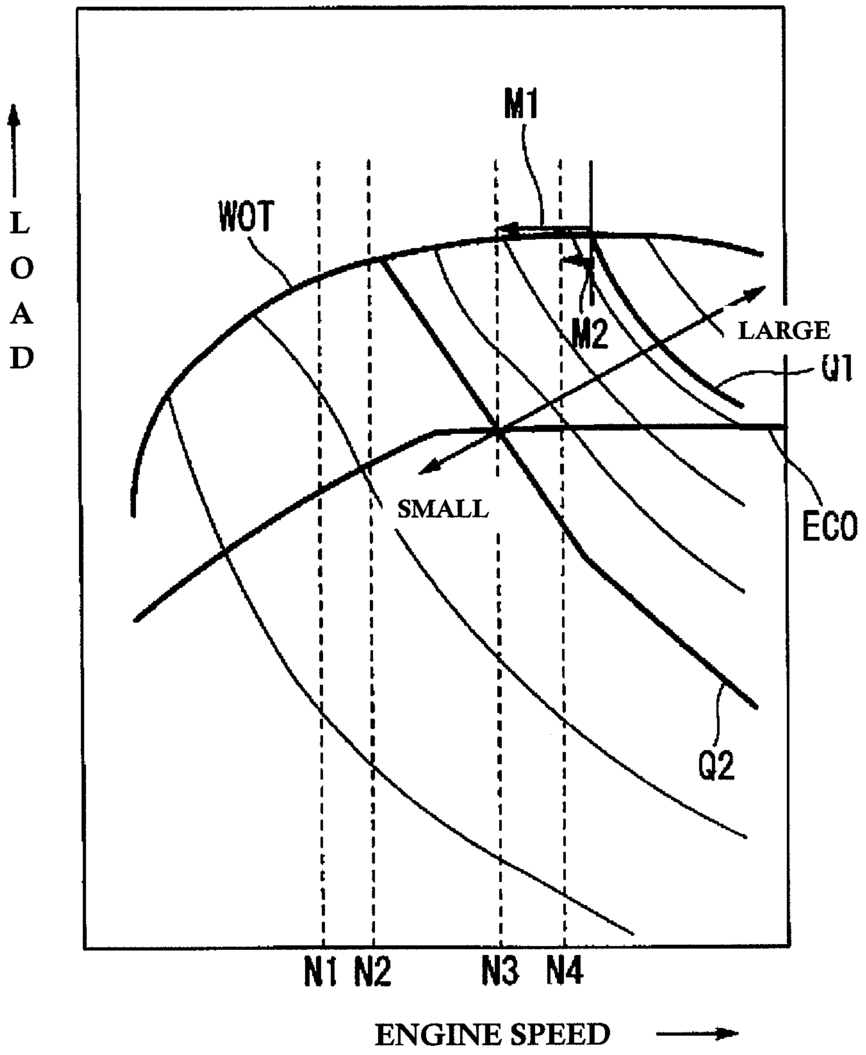
FIG. 3 is a characteristic map showing the volume (rate) of fuel consumption against engine load and engine speed, which also indicates a relationship with engine speed threshold values.

Now referring to FIG. 3, a characteristic map of fuel consumption rate (per unit time) plotted with engine load along the vertical axis and engine speed along the horizontal axis is shown. Those skilled in the art will appreciate that fuel injection volume per cycle of the engine is proportional to engine load. Further, the number of cycles per unit time is in proportion to engine speed. Thus, as shown, the fuel consumption rate becomes large in the high-speed, high-load region (upper right region of the map) while it becomes small in the low speed, low load region (lower left region of the map).

In accordance with one or more embodiments of the present disclosure, and as shown in FIG. 3, an example of a simplified characteristic map is shown. An applied voltage, as shown, is subject to change in three values, i.e., 14 volts, 13 volts, and 12 volts, of battery rated voltage. Therefore, fuel delivery volume/rate may be changed in three steps dependent on the supplied/applied voltage.

Aspects of the characteristic map of FIG. 3 may be used to describe the actual fuel consumption of an engine under load. Line Q1 indicates a fuel consumption rate when the fuel pump is driven at 13 volts. Thus, in FIG. 3, at the high speed, high load region located above Line Q1, a satisfactory supply of fuel may not be possible if the fuel pump is to be operated at 13 volts. Operation at 14 volts may be required for this operation region, and as such, the region above Line Q1 is a region of operation at 14 volts. Likewise, Line Q2 indicates a fuel consumption rate when the fuel pump is operated at 12 volts. The region bounded by Lines Q1 and Q2, above Line Q2 and below Line Q1, is the region in which the fuel pump may be operated at 13 volts. The region below Line Q2 is a low speed, low load region where the fuel pump may be operated at 12 volts.

In view of the actual fuel consumption characteristics just described, embodiments of the present disclosure may be used to determine a required voltage that may be applied to the fuel pump thereby maintaining efficient fuel consumption. One or more embodiments disclosed herein may be configured to control the fuel delivery volume/rate based on, for example, four engine speed threshold values N1, N2, N3, and N4 together with a load characteristic curve ECO that may define a prescribed high load region. Specifically, the load characteristic curve ECO represents a characteristic curve which may be specific to a particular engine, and may define a boundary at a highest load side at which a preferred and/or efficient fuel consumption rate may be ensured. For example, when a driver selects an operation mode via a switch, such as an ECO mode switch, an automatic control may be performed such that the accelerator operation may be restricted compulsorily under the ECO characteristic line. Accordingly, the acceleration of the vehicle may be restricted in the ECO mode such that excessive fuel is not consumed. Alternatively, instead of compulsory restriction of the accelerator pedal, an appropriate alert may be provided to the driver, such that operation in excess of the ECO characteristic line, and thus operation at a high load region, may be avoided as much as possible. Therefore, put in other words, the vehicle, in ECO mode, may operate for the majority of operation time under a suitable fuel consumption rate without exceeding the load characteristic curve.

As used herein, the term "speed threshold" refers to a vehicle speed characteristic threshold, such that different thresholds for different characteristics may be employed. For example, the speed threshold may refer to an engine speed, a rotational speed of an engine, a speed change ratio, a vehicle speed, a current transmission gear, or other vehicle speed characteristic. As discussed below, reference will be made to an engine speed threshold and speed change ratio, but those skilled in the art will appreciate that other vehicle speed characteristics may be used without departing from the scope of the claims. Further, those skilled in the art will appreciate that vehicle speed characteristics may be correlated and/or proportional to the engine speed, such that the engine speed thresholds may be dependent on the vehicle speed characteristics.

The speed threshold values described herein may also be predetermined predictive values, such that the fuel pump controller may predict a necessary increase in fuel delivery rate. Accordingly, the speed threshold values may be employed such that when a predicted increase in fuel supply is anticipated, the fuel pump controller may react to conditions appropriately such that fuel efficiency may be maintained. Further, the fuel pump controller may predict a rapid increase in engine speed (rotational speed of the engine) when the gear, speed change ratio, or other vehicle speed characteristic, is below, above, or in relation to a prescribed value. As such, the fuel pump controller may be configured to anticipate a necessary increase in fuel supply in conditions where the engine speed may be increased rapidly.

The speed threshold values shown in FIG. 3, N1 through N4, may be set with a relationship of N1<N2<N3<N4. Specifically, and with reference to the characteristic map, the second speed threshold N2 may be set at a slightly lower speed compared to the speed at which Line Q2 crosses a Wide Open Throttle (WOT) curve. Similarly, the fourth speed threshold N4 may be set at a slightly lower speed at which Line Q1 crosses the WOT curve. In addition, the first speed threshold N1 may be set considering a latitude for vehicle acceleration (i.e., at a predicted, sharp rise in engine speed) such that N1 is set at a lower speed than second speed threshold N2. Similarly, third speed threshold N3 may be set considering a latitude for vehicle acceleration (i.e. at a predicted, sharp rise in engine speed) such that N3 may be located at a lower speed than fourth speed threshold N4, and yet higher than second speed threshold N2.

Figure 2:
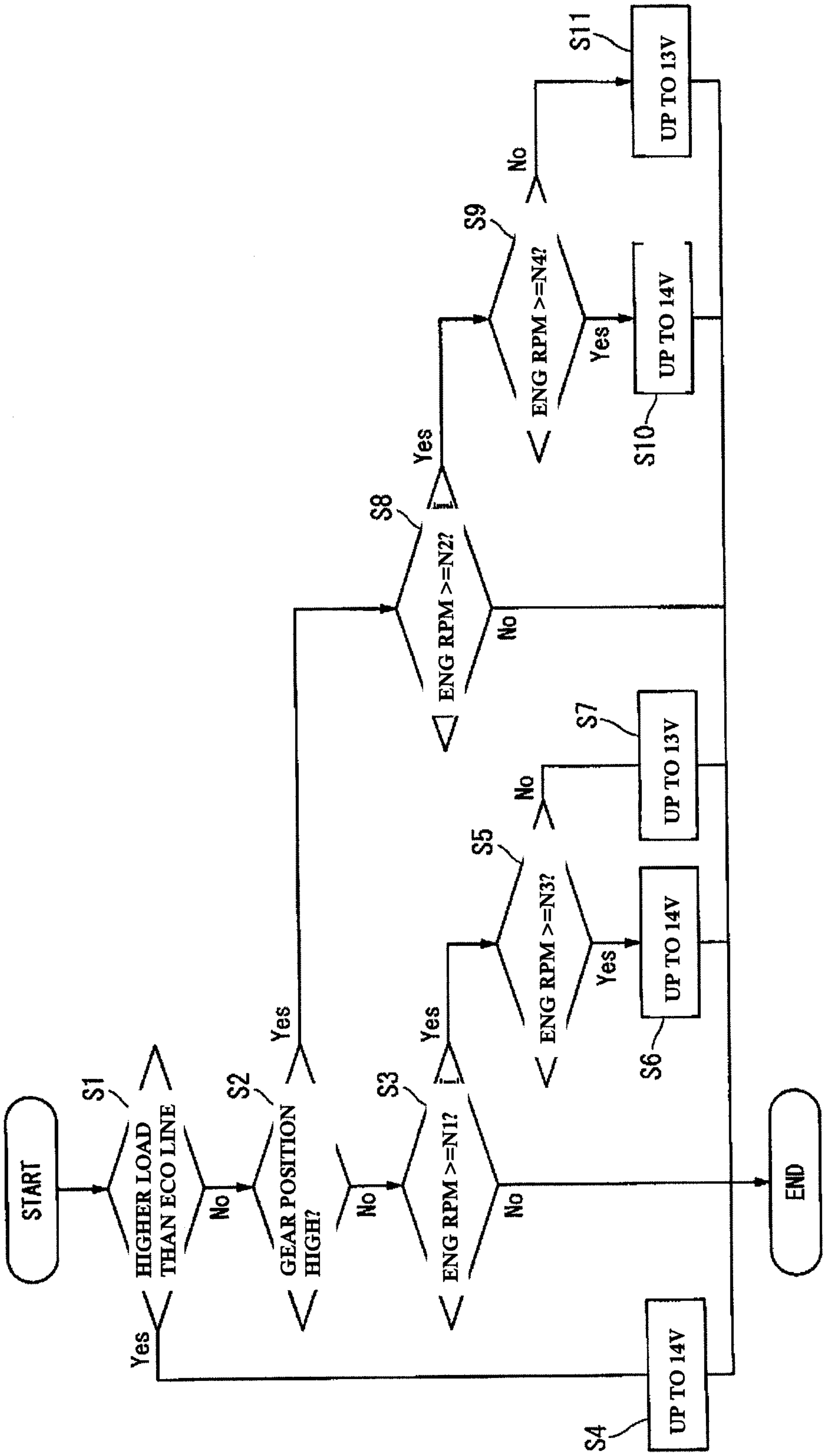
FIG. 2 is a flow chart showing the flow of the control process in accordance with one or more embodiments disclosed herein.

Referring now to FIG. 2, a flow chart of a control process controlling voltage applied to a fuel pump is shown. Accordingly, FIG. 2 shows a control process of the fuel delivery volume or rate as supplied to an engine of a vehicle.

First, at step S1, based on the engine operating conditions such as engine load and engine rotational speed, a determination may be made as to whether the operating area of the engine is situated higher on the load side than the ECO curve, as shown in FIG. 3, and discussed above. If "YES," the control proceeds to step S4, and an alternator may be put in operation and may generate a voltage at 14 volts, irrespective of engine speed and/or speed change ratio and/or other vehicle speed characteristic or threshold value. This control ensures a sufficient fuel quantity is fed to the engine.

When operating at a load position lower than the load characteristic curve ECO, "NO" at step S1, control may advance to step S2 and determination of the speed change ratio (gear ratio or gear) may be made. Specifically, at step S2, a simple determination may be made and the current gear may be compared to a preset gear and categorized into two groups. For example, if the current gear is detected to be at a low gear, for example first or second, then the current gear may be determined as a higher speed change ratio or lower speed ratio. In contrast, when the current gear is detected to be a higher gear, such as third or higher, then the current gear may be determined as a lower speed change ratio or higher speed ratio. If operating at a low gear, "NO" at step S2, control proceeds to step S3, at which the current engine speed is compared to a first speed threshold N1. If the current engine speed is determined to be less than the first speed threshold N1, an active increase of an applied voltage may be prohibited. Therefore, the standard 12 volts may be applied to the fuel pump. Thus, the fuel pump may not be operated to provide an excessive delivery volume or rate, and, consequently, reduction of return fuel, alleviation of pump operating noise, and suppression of electric power consumption may be achieved.

When determined to be operating under a low speed change ratio and the engine speed exceeds the first speed threshold N1, the control proceeds further to step S5, "YES" at step S3, and compares the current engine speed with the third speed threshold N3. If the engine speed is detected to be less than the third speed threshold N3, "NO" at step S5, the control advances to step S7, where the alternator is operated to generate electricity at 13 volts. If the current speed is determined to be larger than the third speed threshold N3, "YES" at step S5, control advances to step S6, where the alternator is operated to generate electricity at 14 volts.

As described earlier, the first speed threshold N1 may be set such that, even if a throttle operation is at full throttle (Line WOT), the consumption rate may be maintained less than that corresponding to Line Q2 (corresponding to 12 volt application). Similarly, the third speed threshold N3 may be set such that, even if a throttle operation is wide open, the consumption rate may be maintained less than Line Q1 (13 volt application line). Hence, by allocating the 13 volt region between the first speed threshold N1 and the third speed threshold N3, and 14 volts for the region above the third speed threshold N3, a shortage of fuel delivery rate may be avoided even during a load increase at a high vehicle acceleration.

In particular, because the third speed threshold N3 may be set at a lower engine speed as compared to Line Q1 corresponding to the 13 volt application line, even if an automatic transmission is operating under a low gear, such as first or second gear, and the vehicle is accelerated with a rapid increase in engine speed, a satisfactory fuel delivery rate may be secured. As shown in FIG. 3, the difference between N3 and where Line Q1 is shown by a difference M1. As such, 14 volts may be applied before the actual engine speed exceeds the Line Q1, allowing for sufficient fuel delivery and adequate acceleration. Therefore, an anticipatory and transitional increase in fuel delivery may be satisfactorily provided.

In the above described embodiments, a generation voltage of the alternator may be set to be 14 volts, and a time delay may be expected to the point at which the delivery volume is actually increased in response to the fuel pump being supplied with the increased voltage. Despite this response delay, however, a sufficient amount of latitude, the difference M1, may prevent any shortage of fuel delivery. Likewise, because the first speed threshold N1 has latitude as compared to Line Q2, a difference from Line Q2, corresponding to the 12 volt application line, even if an automatic transmission is operative under a low speed ratio (gear), such as first or second gear, and the vehicle may be accelerated with a rapid increase of engine speed, the likelihood of a shortage in fuel delivery may be reduced because the fuel delivery volume may be set for a volume corresponding to 13 volts before the engine speed exceeds Line Q2.

Referring again to FIG. 2, at step S2, if the current gear is determined to be a high gear, such as third gear or higher, for example, the control proceeds to step S8, where a comparison may be made with the second speed threshold N2. If the current engine speed is detected to be less than the second speed threshold N2, an increase of the applied voltage in an active manner may be withheld. Thus, a battery voltage of 12 volts may be applied to the fuel pump. This way, the fuel pump may not be driven at an excessive delivery rate, and reduction of returned fuel, alleviation of pump operating noise, and suppression of electricity consumption may be achieved.

If determined at step S8 that the current engine speed is equal to or larger the second speed threshold N2, the control proceeds to step S9, where the current engine speed may be compared to the fourth speed threshold N4. If the current engine speed is determined to be less than the fourth speed threshold N4, the control may advance to step S11 and the alternator may become operative to generate electricity at 13 volts. On the other hand, if the current engine speed is determined to be more than the fourth speed threshold N4, control may proceed to step S10 where the alternator may be operated to generate electricity at 14 volts.

As explained above, the fourth speed threshold N4 may be set at a higher speed position than the third speed threshold N3, and the latitude, or difference, M2 compared to a 13 volt application line Q1 may be smaller than the latitude, or difference, M1 of the third speed threshold. Therefore, a rapid increase of the engine speed in response to an acceleration of the vehicle may cross the Line Q1 prior to the actual delivery volume increase. However, the gears in this situation may be in a higher speed (i.e. lower speed ratio) such that an increase in engine speed may be kept at a moderate degree and, therefore, avoiding a shortage of fuel delivery volume. Accordingly, at high speed gears, up to second speed threshold N2, the fuel pump may be driven under 12 volts such that an excessive operation of the fuel pump may be avoided.

Moreover, generally at steady running condition under high speed gear ratio, when an accelerator pedal is depressed rapidly, a forcible downshifting known as a kick-down operation may be initiated. In accordance with one or more embodiments of the present disclosure, when the forcible gear shifting is performed (kick-down), the speed threshold values may be changed simultaneously from the fourth speed threshold N4 to the third speed threshold N3 and from the second speed threshold N2 to the first speed threshold N1, respectively. Therefore, without a need to wait for an engine speed increase, the voltage applied to the fuel pump may be increased at the same time as the downshifting operation, thus a required delivery volume may be obtained.

As discussed above, in accordance with one or more embodiments of the present disclosure, the start and/or stop of the generation operation of the alternator and the applied voltage may be variably controlled. Furthermore, the alternator may be responsive to factors other than the requirement for fuel delivery volume for the fuel pump. Specific operation states of the vehicle may override the described fuel delivery control described above. For example, a required electric power for electric appliances in a vehicle or a state of charge (SOC) of the battery may be used to control the operation of the alternator. Those of ordinary skill in the art will appreciate that, if the SOC of a battery requires the alternator to operate at 14 volts, the alternator will be controlled accordingly such that priority is given to quick recovery of the battery. As such, the control of the alternator may have priorities of control for specific operational states of the vehicle, engine, battery, etc.

For example, as stated above when the alternator is driven at a voltage in response to other factors (in specific or predetermined operation states), such as electric power request, that is higher than may be required for fuel delivery volume, then, even if fuel consumption increases abruptly in response to a rapid increase of the engine speed, a relatively short time will suffice to secure the required amount of fuel so that the speed threshold value for an applied voltage change may be shifted to a lower speed value. As such, the fuel pump controller may be configured to determine an operation state of the engine. Various conditions or predetermined operation states may be set such that the fuel pump delivery rate may be controlled according to the operation state, rather than the vehicle speed characteristic. Accordingly, the fuel pump controller may have override states or conditions when fuel pump control as described above may be overridden such that an appropriate fuel supply may be provided for the particular operation state.

Figure 4:
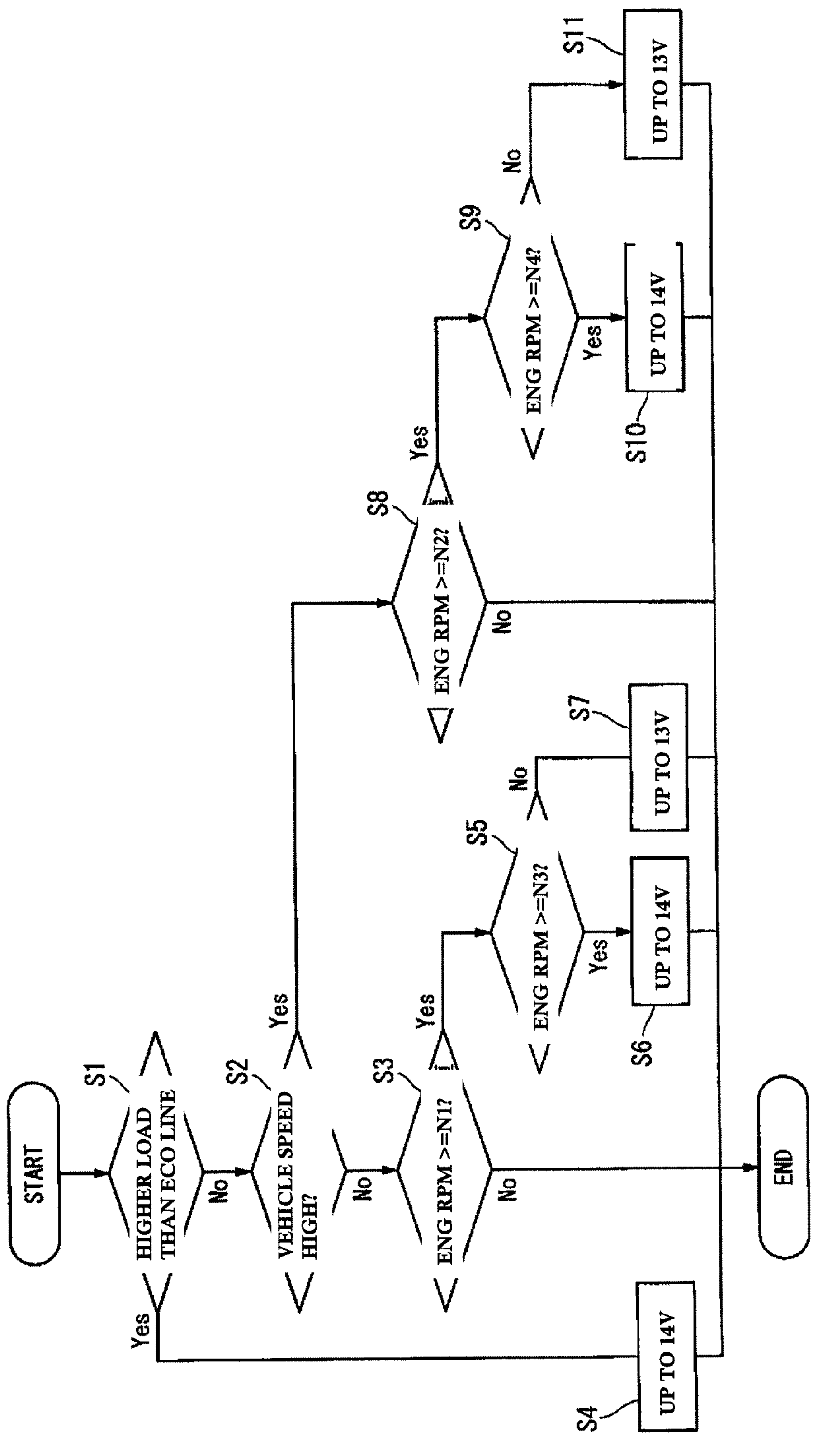
FIG. 4 is a flow chart showing the flow of the control process in accordance with one or more embodiments disclosed herein.

Now referring to FIG. 4, one or more embodiments in accordance with the present disclosure are shown with respect to an alternative speed characteristic. As described above, various vehicle speed characteristics may be used as a basis for determining the fuel delivery rate. For example, as shown in FIG. 4, determination of vehicle speed instead of speed change ratio (gear ratio) may be made at step S2. For example, in an automatic transmission, a speed change ratio may be determined based on a shifting map using vehicle speed and accelerator operation state as parameters. Accordingly, if the vehicle travels at a low speed, a low speed gear may be selected, and while at a high vehicle speed, a high speed gear may be selected. Similarly, with respect to a manual transmission, a driver generally shifts to a high speed gear when the vehicle speed is high. Therefore, at step S2, a judgment may be made whether the current vehicle speed is larger than a predetermined value. If determined to be at a low vehicle speed, the control proceeds to step S3. If determined to be at a high vehicle speed, the control proceeds to step S8. The steps other than the judgment at step S2 are the same as those described with respect to FIG. 2, and a detailed explanation is thus omitted for the sake of brevity.

In accordance with one or more embodiments of the present disclosure, if a vehicle travels at low speed, a first engine speed threshold N1 and a third engine speed threshold N3 may be utilized while at a high vehicle speed, a second engine speed threshold N2 and a fourth engine speed threshold N4 may be utilized.

While only selected embodiments have been chosen to illustrate embodiments of the present disclosure, it will be apparent to those skilled in the art from this disclosure that various changes and modifications may be made herein without departing from the scope of the invention as defined in the appended claims. For example, in the embodiments illustrated, the first speed threshold N1 and second speed threshold N2 are different from each other in value and determined based on transmission gear or vehicle speed. However, it is apparent that both thresholds may have the same value to achieve simplified control logic. In addition, in the illustrated examples, speed change ratios and vehicle speed are divided into two regions or groups, however, more than two groups are conceivable to attain a fine control. Further, when using a CVT, the engine speed threshold may be varied continuously or gradually in accordance with a speed change ratio. Regarding delivery volume/rate from the fuel pump, instead of three ranges as described herein, it is conceivable to employ more ranges or even a stepless (continuous) variation of delivery volume or rate. In addition, as described herein, an electrically operative fuel pump is used which varies fuel delivery amount by the applied voltage thereon. It is also conceivable to apply any other type of fuel pump in which a delivery volume may be variably changed by other parameters. Furthermore, although discussed herein with 4 thresholds, those skilled in the art will appreciate that more or fewer threshold values may be used without departing from the scope of the present disclosure.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. An engine fuel pump control apparatus comprising:

an engine connected to a transmission;

a fuel pump interposed in a fuel conduit between a fuel tank and the engine, the fuel pump having a selectively variable fuel delivery rate; and a fuel pump controller configured to adjust a fuel delivery rate from the fuel pump to the engine, wherein, when in a low gear position or a low vehicle speed state, the fuel pump controller increases the fuel delivery rate to a predetermined rate when a rotational speed of the engine surpasses a first engine speed threshold value, wherein, when in a high gear position or a high vehicle speed state, the fuel pump controller increases the fuel delivery rate to the predetermined rate when the rotational speed of the engine surpasses a second engine speed threshold value, and wherein the second engine speed threshold value is higher than the first engine speed threshold value.

2. The control apparatus of claim 1, wherein the fuel pump controller:

adjusts the fuel delivery rate in a stepwise manner when the rotational speed of the engine exceeds the first engine threshold value or the second engine speed threshold value.

3. The control apparatus of claim 1, wherein:

the fuel pump varies the fuel delivery rate in response to an applied voltage; and the fuel pump controller increases the fuel delivery rate to the predetermined rate by increasing the voltage applied to the fuel pump.

4. The control apparatus of claim 3, wherein:

an electric motor of the fuel pump is selectively connected to both a vehicle battery and an alternator that is driven by the engine; and the fuel pump controller is configured to vary the voltage applied to the electric motor of the fuel pump by selectively connecting the electric motor to one of the alternator and the battery.

5. The control apparatus of claim 1, wherein the fuel pump controller is further configured to:

detect an operation state of the engine; and control the fuel delivery rate irrespective of the detected vehicle speed characteristic when the detected operation state of the engine is at a predetermined operation state.

6. The control apparatus of claim 1, wherein:

the fuel pump controller is further configured to predict a rapid increase in engine speed when the detected vehicle speed characteristic is below a prescribed value.

7. A method to control an engine fuel pump comprising:

controlling a fuel delivery rate of a fuel pump to an engine by:

when in a low gear position or a low vehicle speed state, increasing the fuel delivery rate to a predetermined rate when a rotational speed of the engine surpasses a first engine speed threshold value, and when in a high gear position or a high vehicle speed state, increasing the fuel delivery rate to the predetermined rate when the rotational speed of the engine surpasses a second engine speed threshold value, wherein the second engine speed threshold value is higher than the first engine speed threshold value.

8. The method of claim 7, wherein the fuel delivery rate is adjusted in a stepwise manner when the current engine speed exceeds the first engine threshold value or the second engine speed threshold value.

9. The method of claim 7, further comprising:

applying a voltage to the fuel pump;

varying the fuel delivery rate in response to the applied voltage; and increasing the fuel delivery rate to the predetermined rate by increasing the voltage applied to the fuel pump.

10. The method of claim 9, further comprising:

selectively connecting a vehicle battery and an alternator that is driven by a vehicle engine to the fuel pump, wherein the applied voltage is applied from the connected vehicle battery or the connected alternator.

11. The method of claim 7, further comprising:

determining an operation state of an engine; and controlling the fuel delivery rate irrespective of a detected engine speed when the operation state is in a predetermined operation state.

12. The method of claim 7, further comprising:

predicting a rapid increase in engine speed when in the low gear position or the low vehicle speed state.

13. A control apparatus for an engine fuel pump, comprising:

an engine connected to a transmission;

a fuel tank;

a means for pumping fuel interposed in a fuel conduit between the fuel tank and the engine;

a means for selectively varying a fuel delivery rate;

a means for controlling the fuel delivery rate to an engine by:

when in a low gear position or a low vehicle speed state, increasing the fuel delivery rate to a predetermined rate when a rotational speed of the engine surpasses a first engine speed threshold value, and when in a high gear position or a high vehicle speed state, increasing the fuel delivery rate to the predetermined rate when the rotational speed of the engine surpasses a second engine seed threshold value, wherein the second engine speed threshold value is higher than the first engine speed threshold value.

* * * * *